United States Patent [19]
Hansen

[11] Patent Number: 4,581,571
[45] Date of Patent: Apr. 8, 1986

[54] ELECTRICAL POWER DISCONNECT SYSTEM

[75] Inventor: James E. Hansen, Oak Creek, Wis.

[73] Assignee: Eaton Corporation, Cleveland, Ohio

[21] Appl. No.: 585,730

[22] Filed: Mar. 2, 1984

[51] Int. Cl.[4] ............................ H02G 3/00; H02J 7/00
[52] U.S. Cl. ................................ 320/13; 307/10 BP; 320/31
[58] Field of Search .................... 307/10 BP, 10 R; 320/13, 39, 17, 31, 30, 54, 55; 361/79, 92

[56] References Cited

U.S. PATENT DOCUMENTS

| | | | |
|---|---|---|---|
| 2,610,990 | 9/1952 | Musgrove | 320/17 X |
| 3,646,354 | 2/1972 | Von Brimer | 307/10 BP |
| 4,218,717 | 8/1980 | Shuster | 307/10 BP X |
| 4,493,001 | 1/1985 | Sheldrake | 307/10 PB X |

Primary Examiner—R. J. Hickey
Attorney, Agent, or Firm—C. H. Grace; W. A. Autio

[57] ABSTRACT

An electrical power shutdown system for an aircraft includes a battery (B), a battery relay (BR), a plurality of aircraft status sensor switches (SSW), an electrical bus (EB) leading to the power utilization system, a main battery switch (BSW), and a control unit (CS). When the status sensor switches indicate shutdown of the aircraft, the control unit activates a timer (TMR) that controls disconnect elements (Q1, IR) to cause deenergization of the battery relay after a time interval if the pilot forgets to open the main battery switch. The control unit (CS) prevents resetting (closing of the battery relay) on momentary interruption of the positive battery power under shutdown conditions but allows such resetting on momentary interruption of such positive power under normal operative conditions and prevents such resetting regardless of the status if the main battery switch is open. Also, the control unit (CS) limits current flow to virtually zero in the "off" state and allows only minimal current flow in the timed-out state of the timer. Moreover, the control unit allows battery connection not only under normal operative conditions but also for a time interval under shutdown conditions.

13 Claims, 3 Drawing Figures

ELECTRICAL POWER DISCONNECT SYSTEM

The Government has rights in this invention pursuant to Contract No. N00164-82-C-0199 awarded by Department of the Navy.

SUMMARY OF THE INVENTION

An object of the invention is to provide an improved electrical power disconnect system.

A more specific object of the invention is to provide an improved battery connect-disconnect system for automatically disconnecting the electrical power utilization system from the battery after system shutdown in the event the operator fails to do so.

Another specific object of the invention is to provide a battery connect-disconnect system of the aforementioned type which includes a timer for timing a predetermined time interval at the end of which the electrical power utilization system is disconnected from the battery thereby to avoid unnecessary depletion of the battery.

Another specific object of the invention is to provide a battery connect-disconnect system of the aforementioned type that includes battery switching means and operator-controlled on-off switching means for controlling connection and disconnection of the battery under normal operative conditions.

Another specific object of the invention is to provide a battery connect-disconnect system of the aforementioned type that includes battery switching means and operator-controlled on-off switching means operable during shutdown conditions for connecting the battery for a predetermined time interval.

Another specific object of the invention is to provide an improved battery connect-disconnect system of the aforementioned type that includes battery switching means and control means receiving positive to ground voltage from said battery and means operable on momentary interruption of the ground connection to such control means for resetting such battery switching means when the ground connection is reapplied.

Another specific object of the invention is to provide an improved battery connect-disconnect system of controlled switching means operable during such time interval for disconnecting the battery immediately.

Another specific object of the invention is to provide a timer controlled electrical battery disconnect system of the aforementioned type with improved means whereby any failure in the timer circuit or the voltage sensor circuit will not cause the battery to be disconnected during normal operative condition of the system.

Other objects and advantages of the invention will hereinafter appear.

These objects of the invention are accomplished by providing an electrical system comprising a battery connect-disconnect system for automatically disconnecting the electrical power utilization system from the battery after system shutdown in the event the operator fails to do so comprising a source of power comprising an electrical battery, battery switching means for connecting said battery to said electrical power utilization system and for disconnecting the same, operator-controlled on-off switching means, condition responsive means comprising system status sensing and signaling means operable to either of two states indicative of a normal operative condition and a shutdown condition of said electrical system, respectively, and control means for controlling said battery switching means comprising means responsive to setting said operator-controlled switching means in its on state while said system status sensing and signaling means indicate said normal operative condition for causing said battery switching means to connect said battery to said electrical power utilization system and to disconnect the same when said operator-controlled switching means is thereafter set in its off state, and means responsive to said system status sensing and signaling means indicating said shutdown condition while said operator-controlled switching means remains in its on state for automatically causing said battery switching means to disconnect said battery from said electrical power utilization system after a predetermined time interval thereby to limit current flow from said battery to a minimum control value so as to prevent depletion of said battery since the system may remain in this state for an extended period of time.

DESCRIPTION OF THE PREFERRED EMBODIMENT

Figure 1:
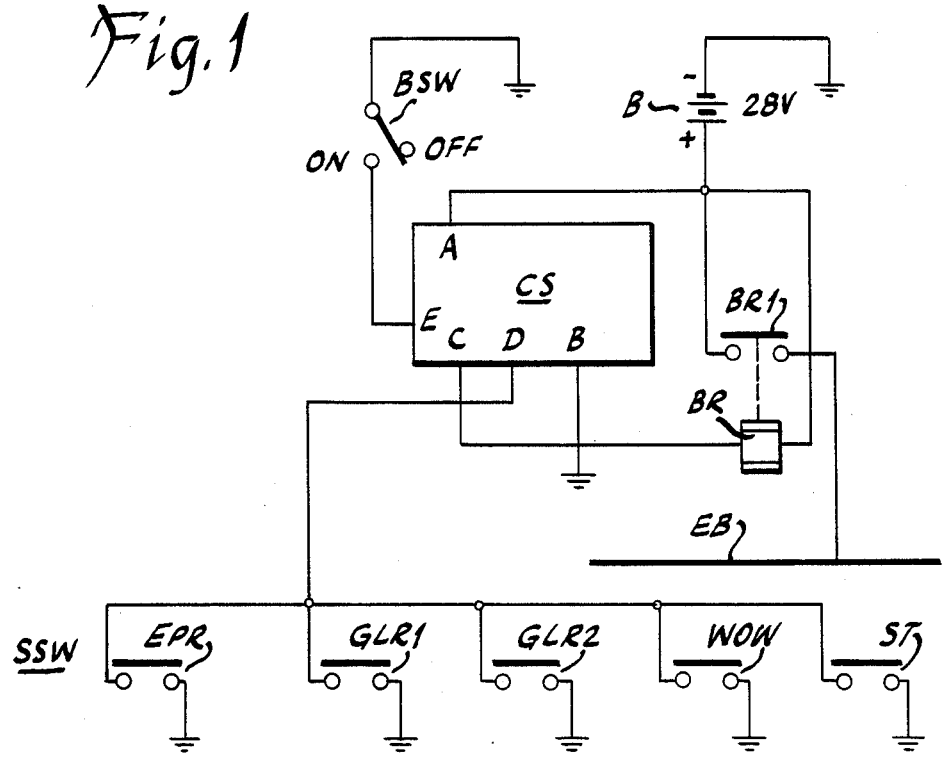
FIG. 1 is a schematic and block diagram of an automatic electrical power disconnect system constructed in accordance with the invention and showing the battery, the battery switching relay, the operator-controlled on-off switch, the status sensing and signaling contacts, the electrical bus which leads to the electrical power utilization system and the control system shown in block form which is shown in detail in FIG. 2.

Referring to FIG. 1, there is shown an electrical power disconnect system constructed in accordance with the invention. Basically, the purpose of the invention is to automatically disconnect the aircraft electrical system from the battery after system shutdown in the event that the pilot forgets to do so manually, thereby preventing depletion of the battery through any residual loads of a type which may be desirable to be kept on temporarily even though the generating system is off. As shown in FIG. 1, a battery relay BR has a normally open contact BR1 which, when closed, connects a battery B to an electrical bus EB which leads to the electrical power utilization system such as an aircraft electrical system. Battery B also supplies operating power to a control unit or control system CS in that the positive side of battery B is connected to supply terminal A of control system CS and terminal B of this the aforementioned type that includes battery switching means and control means receiving positive to ground voltage from the battery and means operable on momentary interruption of the positive voltage to such control means for preventing resetting of the battery switching means on reestablishment of the positive voltage.

Another specific object of the invention is to provide a timed electrical power disconnect system of the aforementioned type which includes improved voltage sensing means effective during the time interval before the battery is disconnected from the electrical power utilization means for detecting a battery voltage below a predetermined safe level and for disconnecting the battery immediately in response thereto.

Another specific object of the invention is to provide an electrical power disconnect system of the aforementioned type with improved means for disconnecting the battery from the main electrical power utilization system after a time interval whereafter the current drawn from the battery is limited to a very low value since the system may remain in this condition for an extended period of time.

Another specific object of the invention is to provide an improved electrical power disconnect system that includes timing means for disconnecting the battery from the main electrical power utilization system a time interval after shutdown if the operator fails to do so and means for resetting the system and reconnecting the battery either before or after such time interval in the event the system receives a signal indicating that the shutdown condition has ended.

Another specific object of the invention is to provide an improved electrical power disconnect system of the aforementioned type which includes timing means operable on a shutdown condition for timing a predetermined time interval at the end of which the battery is disconnected from the main power utilization system and operator-control system is connected to ground. The negative side of battery B is connected to ground and the positive side of battery B is connected through the coil of battery relay BR to terminal C of control system CS and through this control system and terminal E and an operator-controlled on-off battery switch BSW to ground. From this, it will be apparent that if control system CS connects terminal C to terminal E, battery relay BR will be energized to close its contact and thus connect the battery to electrical bus EB.

The system in FIG. 1 is also provided with a plurality of status sensor switches SSW including an external power relay contact EPR which will be closed when the aircraft is receiving external electrical power, generator line relay contacts GLR1 and GLR2 which are closed when the aircraft generators are providing power, a weight-on-wheels relay contact WOW which is closed when there is no weight on the landing gear wheels and a start relay contact ST which is closed during engine starting, all of the sensor switch contacts being shown in FIG. 1 as normally open which represents a shutdown condition of the aircraft.

A "shutdown" condition may be defined as a condition wherein all of the functional and/or dynamic systems of the aircraft, or other device to which the invention may be applied, have been stopped regardless of whether their electrical power source such as the battery is connected or disconnected, this shutdown condition being indicated by the state of status sensor switches.

Figure 2:
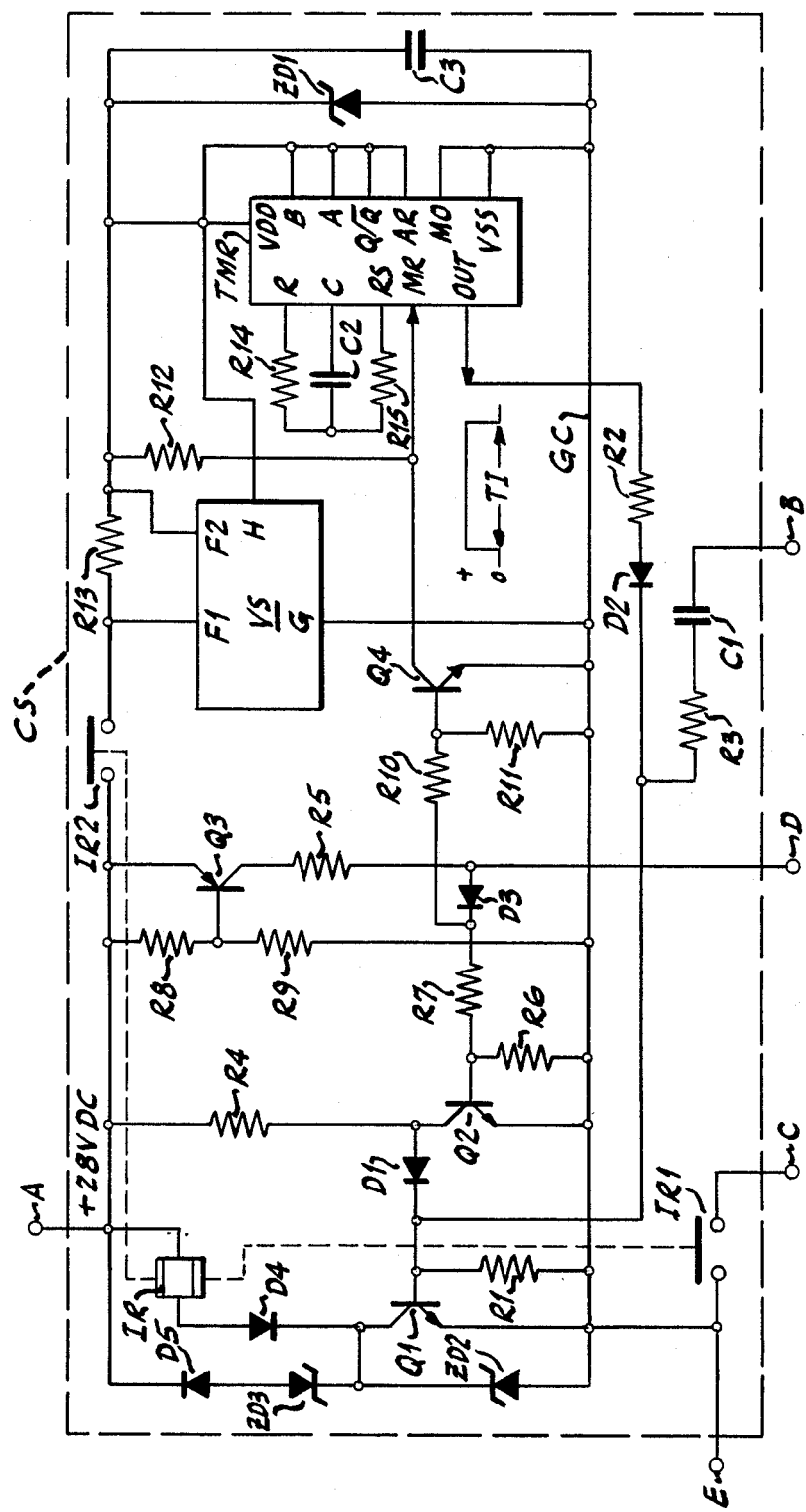
FIG. 2 is a circuit diagram of the control system shown as a block in FIG. 1.

Control system CS shown as a rectangle in FIG. 1 is shown in detail in FIG. 2 within the broken line rectangle marked CS, terminals A, B, C, D and E being also shown in FIG. 2 in the same general locations as they are shown in FIG. 1.

Figure 3:
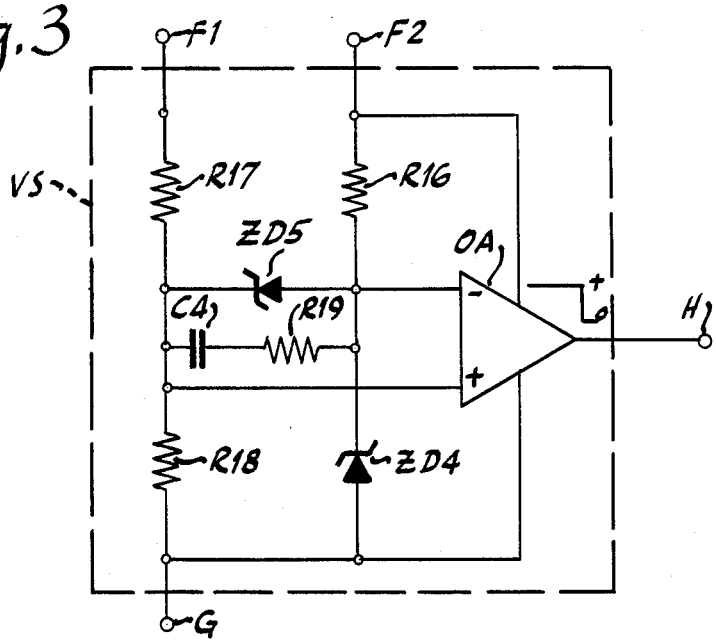
FIG. 3 is a circuit diagram of the voltage sensor shown as a block in FIG. 2.

The rectangle marked VS in FIG. 2 represents a voltage sensor that is shown in detail in FIG. 3 within the broken line rectangle marked VS, its terminals F1, F2, G and H being in the same general locations as they are shown in FIG. 2. The purpose of this voltage sensor circuit VS is to monitor the battery voltage and to prevent the battery from being excessively depleted, for example, to a voltage so low that it can no longer be utilized for its purpose such as operating the aircraft residual loads, and possibly lead to damage due to low voltage i.e., relay doorbelling, etc. If, during a timed disconnect period hereinafter described while the battery relay is closed, the battery is being depleted by some load at an appreciable rate such that it could run dangerously low even within such timed period, the voltage sensor will detect this situation and open the battery relay immediately and prior to time-out of the timer that provides the delayed disconnection.

The operation of the control unit or system CS shown in FIG. 2 will now be described in conjunction with FIGS. 1 and 3. The system shown in FIG. 1, or the aircraft with which it is associated, generally has two operative conditions which will be hereinafter referred to including (1) a normal operative condition when one or more of the sensor switches SSW is closed so as to apply ground to terminal D of control unit CS and (2) a shutdown condition wherein all of the sensor switches SSW are open. The function of the disconnect system will first be described rather generally and thereafter in much more detail by reference to the components of the control unit in FIG. 2.

NORMAL OFF STATE

When battery switch BSW in FIG. 1 is open, battery relay BR will definitely be open (deenergized) and no current will be drawn from the battery by the unit. This is the absolute off state where no load should exist on the battery, not even low current levels to terminal A of control unit CS.

NORMAL ON STATE

When battery switch BSW in FIG. 1 is closed and any one of the status sense switches SSW is closed so as to apply ground to terminal D of control unit CS, indicating definite need for battery relay closure, the battery relay BR will be maintained continuously closed by the control unit which will internally connect terminal C to ground through terminal E and battery switch BSW, thus maintaining battery relay coil power. Under these conditions, the control unit is allowed to draw some current itself to operate, for example, internal relay IR coil power, etc.

TIMER FUNCTION

If the status sensor switches SSW connected to terminal D in FIG. 1 are all open, indicating system shutdown while the aircraft is on the ground, and battery switch BSW is still closed, it is an indication to the control unit that the pilot has probably forgotten the open battery switch BSW. Upon initiation of this condition, i.e., terminal D sees an open state while terminal E is still grounded, the control unit will begin a time delay action whereby it will keep the main battery relay BR closed (terminal C grounded) for a predetermined period of time, then open the ground connection to terminal C automatically deenergizing the battery relay. The control unit thereafter will retain this state until it is reset in certain ways hereinafter described. While in this timed-out state, the control unit will consume very little power, draw no more than 5 milliamps, to prevent battery depletion as it may be left in this state for an extended period of time.

VOLTAGE SENSE

If, during this delay period while the control unit is keeping the battery relay closed, the battery is being depleted by some load at an appreciable rate such that it could run dangerously low even within the delay period, the voltage sensor VS will detect this condition and open the battery relay even prior to the end of the predetermined time delay period.

RESET DURING TIMING

During the time delay period described above, if terminal D is grounded by closure of one or more of the status sensor switches SSW, the time delay function will be terminated and the control unit will maintain the battery relay closed as in its normal continuously closed state or until ground is disconnected from terminal D whereupon a new time delay period is initiated, assuming that battery switch BSW is still closed.

RESET AFTER TIME-OUT

If the control unit has completed time-out and ground has been disconnected from terminal C to open the battery relay BR, reclosing any one or more of the status sensor switches SSW for any reason will cause resetting of the control unit by applying ground to terminal C and thus energizing battery relay BR. Subsequent reopening of all of the closed status sensor switches SSW to remove ground from terminal D would cause the control unit to begin timing the delay period anew.

RESET BY BATTERY SWITCH

If, during the timing period, while ground is disconnected from terminal D, the battery switch BSW is opened, ground will be disconnected from terminal C to deenergize battery relay BR. If this battery switch BSW is reclosed, the control unit will again connect ground to terminal C and if ground is still disconnected from terminal D by the status sense switches SSW, the time period will begin again at the end of which battery relay BR will open.

NON-RESET BEHAVIOR OF POWER INTERRUPTION OF TERMINAL A

If both the battery switch BSW connected to terminal E and the status sense input connected to terminal D are closed, interruption of "positive" voltage to terminal A will result in disconnection of ground from terminal C to open battery relay BR. Reapplication of positive power to terminal A will result in reapplication of ground to terminal C thereby to reenergize battery relay BR whereby to reset the control unit. However, if battery switch BSW is open, no sequence of positive power interruption and reapplication to terminal A will cause connection of ground to terminal C regardless of the state of terminal D, i.e., the system status.

On the other hand, if battery switch BSW is closed to apply ground to terminal E as above but the status switches SSW are all open to disconnect ground from terminal D, interruption and reapplication of power to terminal A will not result in energization of battery relay BR even for an interval. In other words, if the system is left in a state where the main battery switch BSW is left closed while the system is in a shutdown condition with terminal D disconnected from ground and either timing or timed out, interruption and reapplication of power to terminal A will not produce even a temporary closure of main battery relay BR. This has numerous safety implications in that it is not safe to allow power to be reconnected to electrical bus EB and therethrough to the power utilization system merely by momentary interruption of battery power at terminal A of the control unit.

BATTERY SWITCH OPEN, STATUS SENSE SWITCH CLOSED

A condition might occur wherein a status sense ground signal may exist at terminal D while the main battery switch BSW is open so as to disconnect ground from terminal E. Main battery relay BR will be open under these conditions as indicated above under "Normal Off State". Also, under this condition, there is virtually zero current flow through any of the control unit terminals.

CONTROL UNIT

The operation of the control unit or control system CS will now be described in more detail in connection with the circuit diagram shown in FIG. 2. FIG. 3 shows the circuit diagram of the voltage sensor VS shown as a rectangle in FIG. 2. Relay IR at the upper lefthand portion of FIG. 2 is a small internal crystal can relay which is used to provide the output switching at contacts IR1 to the external load, that is, the main battery relay BR coil. Provision of a contact IR1 for this internal switching to the load rather than a semiconductor type of switch provides certain advantages such as low millivolt drop in the "on" condition, can handle higher current and short circuit loads and has better breakdown voltage and leakage characteristics in the "off" state. The other contacts IR2 of this internal relay are used for internal timer and voltage sensor switching hereinafter described.

NPN transistor Q1 is used to internally switch coil current of relay IR. Whenever main 28 volt D.C. power is applied to terminal A and main battery switch BSW is closed to connect ground to terminal E, it is possible for transistor Q1 to energize relay IR as long as certain other conditions exist as hereinafter described. Transistor Q1 can be turned on by current flow into its base either from terminal A through resistor R4 and diode D1, if NPN transistor Q2 is off, or from programmable timer TMR output terminal OUT through resistor R2 and diode D2 or temporarily by a charge on capacitor C1 through resistor R3. The manner in which each of these three circuits will be used to turn on transistor Q1 will be hereinafter described.

NORMAL OPERATIVE CONDITION START-UP

A typical start-up situation under normal operative conditions wherein positive 28 volts D.C. is applied to terminal A, ground is applied to terminal B, both as shown in FIG. 1, and terminal D is connected to ground through one or more of the status sense switches SSW, is initiated by closing main battery switch BSW. The base of transistor Q1 will immediately be biased on from two paths. First, since terminal D is grounded as aforesaid, this ground is applied through diode D3 and resistor R7 to the base of transistor Q2 to hold this transistor off so that the base of transistor Q1 can be biased on through resistor R4 and diode D1. Since terminal D is grounded, PNP transistor Q3 is also turned on but it does not perform any particular function at this time, its purpose being described later in connection with the timing operation. Also, but of little importance in this situation, current is also supplied to the base of transistor Q1 temporarily by the charge on capacitor C1 through resistor R3. Since terminal B is grounded all of the time and terminal A is normally at plus 28 volts D.C. all of the time as shown in FIG. 1, capacitor C1 has been charged through a primary charging path extending through resistor R4, diode D1 and resistor R3 and secondarily through a path extending through resistors R8, R9, R1 and R3, the total resistance in this path being much greater than in the first mentioned primary charging path. Steady state current to capacitor C1 is zero, however, Thus, the high voltage side of capacitor C1 is initially at plus 28 volts D.C. and when terminal E is switched "low" by closure of battery switch BSW, capacitor C1 must discharge through resistor R3 and into the base of transistor Q1 for a period depending on the values of capacitor C1 and resistor R3. As long as terminal D is held "low" with terminal E grounded, transistor Q1 will stay on and, of course, internal relay IR will stay closed. Relay IR closes its contacts IR1 to energize battery relay BR in FIG. 1 which closes its contacts BR1 to connect battery B to electrical bus EB of the power utilization system. Internal relay IR also closes its contacts IR2 which performs no particular function at this time, its purpose being described later in connection with the timing operation. What has been described hereinbefore is a normal steady state operative condition for the aircraft when it is operating.

TYPICAL START-UP DURING SHUTDOWN

Referring back to the start-up situation just described, let it now be assumed that terminal D was ungrounded from a previous power-down situation or shutdown condition which caused all of the status sensor switches SSW to open. When terminal E is now closed to ground by battery switch BSW, transistor Q3 turns on so that transistor Q2 is biased on through transistor Q3, resistor R5, diode D3 and resistor R7 to the base of transistor Q2. It will be apparent that transistor Q3 is always on whenever power exists from terminal A to terminal E. Now, since transistor Q2 is biased on, transistor Q1 cannot receive base bias through resistor R4 and diode D1 so that the only initial base current to transistor Q1 is from the charge on capacitor C1. This charge supplies current flow to hold transistor Q1 on long enough for internal relay IR to close and timer TMR to take over maintenance of transistor Q1. When this happens, contacts IR2 close to supply operating power through resistor R13 and voltage sensor VS to supply terminal VDD of programmable timer TMR.

Timer TMR is a CMOS 4541 type integrated circuit oscillator timer or the like. This timer is a digital type of timer using a built-in oscillator circuit with external R-C timing components such as resistor R14 and capacitor C2 connected from terminals R and C, respectively, and then through resistor R15 to oscillator input terminal RS and which counts down a divider chain to provide long precision time delays even with very small R-C timing components. In this case, resistor R14 is approximately 90 kilohms and capacitor C2 is approximately 0.18 microfarad, both stable components, which provide a 20 minute delay as the basic R-C oscillator time is multiplied by $2^{16}$ for the final time. This type of timer is much more practical for long time delays, that is, over one minute, than a timer using just one R-C constant.

To continue, when relay IR contacts IR2 closed, power was applied to the timer. Resistor R13 provides current limiting and zener diode ZD1 provides a regulated 12 volt D.C. to the timer supply terminal VDD. This positive voltage is also applied to terminals A and B of the timer for frequency selection purposes to select the $2^{16}$ count. This positive voltage is also applied to the Q/$\overline{\text{Q}}$ terminal of the timer to select a high output level for the timer rather than a low output level. This positive voltage is also applied to the automatic reset terminal AR of the timer to disable its automatic reset function for purposes which become apparent as the description proceeds. Ground is applied from terminal E of control unit CS through ground conductor GC to mode terminal MO of the timer to select a single cycle mode of operation rather than a recycle mode of operation and to its other supply terminal VSS. The remaining terminals of the timer include the master reset or input terminal MR and the output terminal OUT.

Having been preconditioned as hereinbefore described, if master reset input MR of the timer is high, that is, NPN transistor Q4 off and resistor R12 pulling terminal MR high, this timer will not run. On the other hand, if transistor Q4 is biased on to apply a low through master reset input MR, the timer will start up. It will be apparent that transistor Q4 is biased on when terminal D of control unit CS is not grounded, that is, a shutdown condition. This start-up of the timer can be initiated when internal relay IR first closes if terminal D is not grounded or, if relay IR has been closed (steady state) with terminal D grounded and then the status sensing switches SSW are opened to unground terminal D.

Returning to the description of operation of control unit CS, base current to transistor Q4 is supplied through transistor Q3, resistor R5, diode D3 and resistor R10. Therefore, as soon as contacts IR2 closed as hereinbefore described, transistor Q4 turns on in the circuit extending through resistor R12. Before transistor Q4 turned on, master reset input MR of the timer was held high through resistor R12 so that the timer did not run. When Q4 turns on, master reset input MR of the timer goes low to allow the timer to start timing. It will be recalled that in the earlier example of start-up of the control unit under normal operative conditions with terminal D grounded, the timer did not start up when the unit was turned on by battery switch BSW because grounded terminal D kept transistor Q4 off. However, under these conditions, terminal D is not grounded so that the timer can start up and provides a high or positive voltage output from its output terminal OUT through resistor R2 and diode D2 to the base of transistor Q1 to maintain transistor Q1 on. Thus, the timer takes over from capacitor C1 to maintain transistor Q1 on after the charge on capacitor C1 has decayed to zero. The timer will thus keep the circuit latched on until it times out. At the end of the time interval TI, as indicated adjacent the output terminal of timer TMR, the output of the timer will go low, transistor Q1 will turn off and relay IR will open. Control unit CS will now remain in this off state until battery switch BSW is opened and reclosed or if ground is applied through the status sensor switches to terminal D either during or after the timed interval. Basically, this sequence permits system start-up with terminal D ungrounded when the battery switch BSW is closed and maintains battery relay closure for a period of time, the timer interval TI, within which terminal D would normally become grounded by generator power closing one or both of the contacts GLR1 and GLR2 or by closure of one or more of the other status sensor switches as a result of which the system would then stay in its steady state "on" or normal operative condition.

For this purpose, if terminal D is reclosed to ground during the timer time interval, transistor Q4 will turn off to stop and reset the timer and transistor Q1 will stay on due to current flow through resistor R4 and diode D1 since ground at terminal D now has turned transistor Q2 off.

On the other hand, if terminal D remains ungrounded during the timer time interval until time-out, the output of terminal OUT will go low, bias to transistor Q1 will be terminated, relay IR will open, power to the timer circuit will be disconnected at contacts IR2 and the control unit will latch open, opening battery relay BR and remaining in this state until it is reset.

The function and purpose of some of the other elements in FIG. 2 will now be described. Transistor Q3 is used strictly to reduce the current flowing through resistor R5 to terminal D to virtually zero during the condition where terminal D is connected to ground and battery switch BSW is opened to remove ground from terminal E. For this purpose, it will be apparent that when terminal E is disconnected from ground, resistor R8 cannot hold the base of transistor Q3 on. When transistor Q3 goes off, current through resistor R5 goes to zero or at most a few nanoamps. When terminal E is grounded by the main battery switch BSW being turned on, transistor Q3 is biased on and supplies resistor R5 with necessary bias current for transistors Q2 and Q4 switching functions, yet under this condition, current flow through terminal D is no problem.

Diode D3 assures that no current will flow into a grounded terminal D when terminal E is disconnected from ground. Diode D3 does this by blocking any reverse current flow thereto from resistor R7 or R10.

Contact IR2 opens the entire timer supply circuit, assuring zero current in that direction whenever relay IR is open. If this interruption were not provided, significant current flow could exist through terminal E after a time-out (terminal D ungrounded).

Diode D1 provides an offset voltage between the collector-to-emitter voltage saturation state of transistor Q2 and the base of transistor Q1, helping assure an off state of transistor Q1. Diode D1 also permits capacitor C1 to dump its charge into the base of transistor Q1 during turn-on. If diode D1 were not there, capacitor C1 would discharge through resistor R3 into the saturated (on) collector of transistor Q2.

Resistors R4 and R9 are chosen in value not to produce more than five milliampere current draw when terminal E is grounded, terminal D is ungrounded and the timer has timed out.

The resistance of resistor R4 is high so that transistor Q2 is not likely to short on the resultant low current use thereby assuring reliability of this part of the control unit. Also, if transistor Q1 should fail, it will most likely short rather than open, still allowing control of relay IR by battery switch BSW.

Diode D2 prevents any of the capacitor C1 charge being diverted through resistor R2 into output terminal OUT of timer TMR.

Resistor R2 is a current limiting resistor from the output of the timer to the base of transistor Q1.

Resistor R15 is a resistor normally used with the timer for proper operation.

Capacitor C3 is used as a noise supressor and filter capacitor across the zener diode regulator ZD1 of the timer circuit.

Zener diode ZD2 limits voltage transients across the collector-to-emitter terminals of transistor Q1 when this transistor is in its off state.

Diode D4 prevents reverse polarity power from closing relay IR.

Diode D5 and zener diode ZD3 form a clamp circuit to suppress coil transients generated by the relay IR coil. Also, since the external load, i.e., battery relay coil, is now tied to terminal C of this control unit and internal contact IR1 feeds to terminal E rather than to a fixed ground such as at terminal B, whenever battery switch BSW is opened at terminal E, the external relay BR coil transient is propagated into terminal E until contacts IR1 open. This transient flows through zener diode ZD2, which is forward biased, into zener diode ZD3 which is reverse biased and then through diode D5 which is forward biased to terminal A and therethrough to 28 volts D.C. and back to the high side of the coil of relay BR. Zener diode ZD3 becomes the primary dissipating element (coil energy absorber) in the loop until contacts IR1 open. Connecting contact IR1 to terminal E rather than to a fixed ground at terminal B guarantees that the battery relay BR coil current will be opened when the main battery switch BSW is opened even if the internal relay contacts IR1 are welded closed. This provides a redundant break that would not exist if the internal relay contact were grounded through terminal B.

From the foregoing, it will be apparent that when terminals D and E are grounded as they are in the normal running situation or normal operative condition, no failure such as opening of internal relay IR can be caused by the timer circuit malfunctioning in any way. The timer circuit functions only to keep transistor Q1 biased on during the time interval and has nothing to do with keeping transistor Q1 biased on during normal "on" conditions. Even if the timer should completely short out, that is, output terminal OUT grounded, this will not prevent normal closure of battery relay BR when terminals E and D are both grounded.

Diode D3 and resistors R6 and R7 provide an offset voltage for terminal D requiring terminal D to go to approximately 2 volts before the base of transistor Q2 recognizes terminal D to be open from ground. This desirable offset permits some noise immunity to the terminal D input. Resistors R10 and R11 are chosen to cause transistor Q4 to turn on at a lower voltage threshold appearing at terminal D than transistor Q2 turns on at when terminal D opens, so as to assure that the timer starts to hold transistor Q1 on before transistor Q2 removes transistor Q1 base bias from resistor R4. The transistor Q4 collector load resistor R12 is much higher in resistance than resistor R4 in the collector circuit of transistor Q2 which also helps to assure that transistor Q4 goes on earlier. These considerations are especially important if terminal D were caused to rise in voltage at a slow rate which, however, is not likely to happen.

VOLTAGE SENSOR FUNCTION

Referring to FIG. 2, it will be apparent that voltage sensor VS has positive voltage supply terminals F1 and F2 connected across resistor R13 and a ground supply terminal G which is connected to ground conductor GC whereas its output terminal H is connected to supply terminal VDD of timer TMR. The purpose of this voltage sensor VS is to sense the battery voltage appearing across its terminals F1 and G and if this voltage falls too low, during the timing interval of timer TMR, for proper operation of the control unit and system, to cause the timer output to go low thereby to open internal relay IR and, in turn, open the battery relay BR.

Referring to FIG. 3, it will be seen that voltage sensor VS includes an operational amplifier or op-amp OA such as a CA 3140 type or the like which is used in a comparator mode. Its inverting input is clamped to a reference voltage of a predetermined value such as, for example, 6.9 volts D.C. by a stable voltage reference element ZD4 such as an LM124, to which current flows through resistor R16. Voltage divider resistors R17 and R18 are selected in ratio such that output H is normally high and is applied to timer TMR and when the voltage from terminal A to terminal E of control unit CS drops to a predetermined level such as 18 volts D.C., the noninverting input of the comparator drops to the reference level and the output of the comparator toggles low as indiciated by the pulse adjacent the output of op-amp OA. The comparator output was used as the power supply for the timer TMR. Thus, during the timing interval of timer TMR, i.e., terminal E low and terminal D high, when the timer output at its terminal OUT is holding transistor Q1 on, if the comparator output H toggles low, the timer output will also go low and transistor Q1 will turn off and relay IR will open, which results in latching the circuit open at terminal C and deenergization of battery relay BR. After this, assuming that the battery voltage restores to its proper value, the circuit will have to be reset before relay IR can be closed again and this resetting can be done either by closing one or more status sense switches to apply ground to terminal D or by opening and reclosing battery switch BSW. As will therefore be apparent, the voltage sense function can override the time delay function if during the time interval of the timer the system battery voltage drops below a safe level such as 18 volts or below.

In voltage sensor circuit VS, the filter network including capacitor C4 and resistor R19 prevents the comparator from being accidently toggled by a temporary dip in system voltage. Zener diode ZD5 prevents high voltage surges at terminal A from damaging the noninverting input of the comparator by shunting such high voltage surges through the low impedance reference diode D10 to ground.

While the apparatus hereinbefore described is effectively adapted to fulfill the objects stated, it is to be understood that the invention is not intended to be confined to the particular preferred embodiment of electrical power disconnect system disclosed, inasmuch as it is susceptible of various modifications without departing from the scope of the appended claims.

I claim:

1. An electrical control system in combination with a battery and an electrical power utilization system for automatically disconnecting the electrical power utilization system from the battery after system shutdown in the event the operator fails to do so while leaving said control system connected to said battery comprising:
   a source of power comprising an electrical battery;
   power switching means for connecting said electrical power utilization system to said battery and for disconnecting the same;
   operator-controlled on-off control switching means;
   condition responsive means comprising system status sensing and electrical signaling means operable to either of two states indicative of a normal operative condition and a shutdown condition of said electrical control system, respectively;
   and control means for controlling said power switching means comprising:
   means responsive to setting said operator-controlled on-off control switching means in its on state while said system status sensing and electrical signaling means indicates said normal operative condition for causing said power switching means to connect said electrical power utilization system to said battery and to disconnect the same when said operator-controlled on-off control switching means is thereafter set in its off state;
   and means responsive to said system status sensing and electrical signaling means indicating said shutdown condition while said operator-controlled on-off control switching means remains in its on state for automatically causing said power switching means to disconnect said electrical power utilization system from said battery after a predetermined time interval while leaving said control system connected to said battery thereby to limit current flow from said battery to a minimum control value so as to prevent depletion of said battery since the system may remain in this state for an extended period of time.

2. The electrical control system in combination with a battery and an electrical power utilization system for automatically disconnecting the electrical power utilization system from the battery after system shutdown in the event the operator fails to do so as claimed in claim 1, wherein:
   said control means for controlling said power switching means also comprises:
   means responsive to setting said operator-controlled on-off control switching means in its off state during said time interval for causing said power switching means immediately to disconnect said electrical power utilization system from said battery.

3. An electrical control system in combination with a battery and an electrical power utilization system for automatically disconnecting the electrical power utilization system from the battery after system shutdown in the event the operator fails to do so while leaving said control system connected to said battery comprising:
   a source of power comprising an electrical battery;
   power switching means for connecting said electrical power utilization system to said battery and for disconnecting the same;
   operator-controlled on-off control switching means;
   condition responsive means comprising system status sensing and signaling means operable to either of two states indicative of a normal operative condition and a shutdown condition of said electrical control system, respectively;
   and control means for controlling said power switching means comprising:
   means responsive to setting said operator-controlled on-off control switching means in its on state while said system status sensing and signaling means indicates said normal operative condition for causing said power switching means to connect said electrical power utilization system to said battery and to disconnect the same when said operator-controlled on-off control switching means is thereafter set in its off state;
   means responsive to said system status sensing and signaling means indicating said shutdown condition while said operator-controlled on-off control switching means remains in its on state for automatically causing said power switching means to disconnect said electrical power utilization system from said battery after a predetermined time interval while leaving said control system connected to said battery thereby to limit current flow from said battery to a minimum control value so as to prevent depletion of said battery since the system may remain in this state for an extended period of time;

means responsive to setting said operator-controlled on-off control switching means in its off state during said time interval for causing said power switching means immediately to disconnect said electrical power utilization system from said battery;

and means responsive to thereafter setting said operator-controlled on-off control switching means back in its on state while said system status sensing and signaling means still indicates said shutdown condition for causing said power switching means to connect said electrical power utilization system to said battery for another time interval and to disconnect the same at the end of said time interval or to disconnect the same immediately if said operator-controlled on-off control switching means is reset in its off state during said another time interval.

4. An electrical control system in combination with a battery and an electrical power utilization system for automatically disconnecting the electrical power utilization system from the battery after system shutdown in the event the operator fails to do so while leaving said control system connected to said battery comprising:

a source of power comprising an electrical battery;

power switching means for connecting said electrical power utilization system to said battery and for disconnecting the same;

operator-controlled on-off control switching means;

condition responsive means comprising system status sensing and signaling means operable to either of two states indicative of a normal operative condition and a shutdown condition of said electrical control system, respectively;

and control means for controlling said power switching means comprising:

means responsive to setting said operator-controlled on-off control switching means in its on state while said system status sensing and signaling means indicates said normal operative condition for causing said power switching means to connect said electrical power utilization system to said battery and to disconnect the same when said operator-controlled on-off control switching means is thereafter set in its off state;

means responsive to said system status sensing and signaling means indicating said shutdown condition while said operator-controlled on-off control switching means remains in its on state for automatically causing said power switching means to disconnect said electrical power utilization system from said battery after a predetermined time interval while leaving said control system connected to said battery thereby to limit current flow from said battery to a minimum control value so as to prevent depletion of said battery since the system may remain in this state for an extended period of time;

and means responsive to setting said operator-controlled on-off control switching means in its on state while said system status sensing and signaling means indicates said shutdown condition for causing said power switching means to connect said electrical power utilization system to said battery for a time interval and to disconect the same at the end of said time interval or to disconnect the same immediately if said operator-controlled on-off control switching means is reset in its off state during said time interval.

5. The electrical control system in combination with a battery and an electrical power utilization system for automatically disconnecting the electrical power utilization system from the battery after system shutdown in the event the operator fails to do so as claimed in claim 1, wherein:

said control means for controlling said power switching means also comprises:

means responsive to said system status sensing and electrical signaling means changing from said shutdown indicating condition to said normal operative indicating condition during said time interval for resetting said system by interrupting said time interval and for causing said power switching means to thereafter maintain said electrical power utilization system connected to said battery.

6. The electrical control system in combination with a battery and an electrical power utilization system for automatically disconnecting the electrical power utilization system from the battery after system shutdown in the event the operator fails to do so as claimed in claim 5, wherein:

said control means for controlling said power switching means also comprises:

means responsive to said system status sensing and electrical signaling means changing back to said shutdown indicating condition after said electrical power utilization system has been maintained connected as aforesaid for timing another like time interval and for causing said power switching means to disconnect said electrical power utilization system from said battery at the end of said another time interval.

7. The electrical control system in combination with a battery and an electrical power utilization system for automatically disconnecting the electrical power utilization system from the battery after system shutdown in the event the operator fails to do so as claimed in claim 1, wherein:

said control means for controlling said power switching means also comprises:

means responsive to said system status sensing and electrical signaling means changing from said shutdown indicating condition to said normal operative indicating condition after said time interval for resetting said system by causing said power switching means to reconnect said electrical power utilization system to said battery.

8. The electrical control system in combination with a battery and an electrical power utilization system for automatically disconnecting the electrical power utilization system from the battery after system shutdown in the event the operator fails to do so as claimed in claim 7, wherein:

said control means for controlling said power switching means also comprises:

means responsive to said system status sensing and electrical signaling means changing back to said shutdown indicating condition after said resetting for timing another like time interval and for causing said power switching means to disconnect said electrical power utilization system from said battery at the end of such another time interval.

9. The electrical control system in combination with a battery and an electrical power utilization system for automatically disconnecting the electrical power utilization system from the battery after system shutdown in the event the operator fails to do so as claimed in claim 1, wherein:
  said control means for controlling said power switching means also comprises:
  means supplying operating power to said control means from the positive voltage side of said battery to ground;
  and means responsive to interruption and reapplication of said positive voltage supply power to said control means when said operator-controlled switching means is in its on state and said system status sensing and signaling means indicates said normal operative condition for causing said power switching means to disconnect and reconnect, respectively, said electrical power utilization system from and to said battery.

10. The electrical control system in combination with a battery and an electrical power utilization system for automatically disconnecting the electrical power utilization system from the battery after system shutdown in the event the operator fails to do so as claimed in claim 9, wherein:
  said control means for controlling said power switching means also comprises:
  means responsive to momentary interruption of said positive voltage supply power to said control means when said operator-controlled switching means is in its off state for preventing operation of said power switching means regardless of whether said system status sensing and electrical signaling means indicates said normal operative condition or said shutdown condition.

11. The electrical control system in combination with a battery and an electrical power utilization system for automatically disconnecting the electrical power utilization system from the battery after system shutdown in the event the operator fails to do so as claimed in claim 1, wherein:
  said control means for controlling said power switching means also comprises means supplying operating voltage to said control means from said battery;
  and said condition responsive means also comprises voltage sensor means responsive to the voltage supplied from said battery to said control means dropping to a predetermined low value during said time interval for causing said power switching means to disconnect said electrical power utilization system from said battery thereby to prevent depletion of said battery to an inoperatively low voltage level.

12. The electrical control system in combination with a battery and an electrical power utilization system for automatically disconnecting the electrical power utilization system from the battery after system shutdown in the event the operator fails to do so as claimed in claim 11, wherein:
  said control means for controlling said power switching means also comprises:
  means whereby any failure in said voltage sensor means will not cause said power switching means to disconnect said electrical power utilization system from said battery when said system status sensing and signaling means indicates said normal operative condition and said operator-controlled on-off control switching means is in its on state.

13. The electrical control system in combination with a battery and an electrical power utilization system for automatically disconnecting the electrical power utilization system from the battery after system shutdown in the event the operator fails to do so as claimed in claim 1, wherein:
  said means for automatically causing power disconnect after a predetermined time interval comprises:
  an electronic timer for timing said predetermined time interval;
  and means whereby any failure in said timer will not cause said power switching means to disconnect said electrical power utilization system from said battery when said system status sensing and electrical signaling means indicates said normal operative condition and said operator-controlled on-off control switching means is in its on state.

* * * * *